3,164,606
HYDRAZIDES OF XANTHENECARBOXYLIC ACID AND THIOXANTHENECARBOXYLIC ACID
John W. Cusic, Skokie, and Calvin H. Lovell, Morton Grove, Ill., assignors to G. D. Searle & Co., Chicago, Ill., a corporation of Delaware
No Drawing. Filed Aug. 23, 1962, Ser. No. 218,835
7 Claims. (Cl. 260—326.3)

The present invention relates to a group of hydrazides of 9-xanthenecarboxylic acid and 9-thioxanthenecarboxylic acid. Simple hydrazides are involved such as those derived from hydrazine itself or from (lower alkyl)hydrazines, di(lower alkyl)hydrazines, phenyl(lower alkyl)hydrazines, and N-amino derivatives of simple cyclic amines. More particularly, the invention relates to a group of compounds having the following general formula

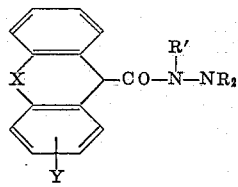

wherein X is an element of periodic group VI of an atomic weight below 40; R' is hydrogen or methyl; —NR$_2$ is amino, (lower alkyl)amino, di(lower alkyl)amino, phenyl(lower alkyl)amino, pyrrolidinyl, piperidino, hexamethylenimino, and monomethyl and dimethyl substituted derivatives of the cyclic amino radicals referred to above; Y is hydrogen or halogen.

The lower alkyl radicals referred to above contain up to 6 carbon atoms and they are exemplified by radicals such as methyl, ethyl, propyl, and butyl. Likewise, in the phenyl(lower alkyl) radicals referred to above, the lower alkyl radicals contain up to 6 carbon atoms. Thus, examples of the phenyl(lower alkyl) radicals are benzyl, phenethyl, and α-methylphenethyl. Examples of the methyl substituted cyclic amino radicals referred to above are 3-methyl-1-pyrrolidinyl, 2-methylpiperidino, and 2,6-dimethylpiperidino. The halogen atoms referred to above include fluorine, chlorine, bromine, and iodine. X is oxygen or sulfur.

The compounds of the present invention can be conveniently prepared by adding 9-xanthenecarbonyl chloride or 9-thioxanthenecarbonyl chloride to the appropriate hydrazine in an inert solvent such as dry toluene or chloroform and allowing the mixture to stand for several hours before isolating the product. Other inert solvents such as benzene and dioxane are likewise suitable for use in carrying out the above reaction.

The simple hydrazides of the present invention can also be prepared by heating the appropriate hydrazine with the appropriate lower alkyl ester, preferably the methyl ester. In the case of the mono-substituted hydrazides, the substituted acyl hydrazide can be reacted with an aldehyde or a ketone to give the hydrazone and this can be reduced to the hydrazine, preferably by hydrogenation over platinum.

The compounds of this invention possess valuable pharmacological properties. In particular, the present compounds possess useful central nervous system activity. Thus, they have the ability to reduce conflict and fear but lack other central nervous system activities such as stimulation or depression. The present compounds also possess activity as appetite inhibitors and pepsin inhibitors. Furthermore, they possess anti-fungal activity which is demonstrated by their inhibition of the growth of Tricophyton mentagrophytes.

The compounds which constitute this invention and t preparation will appear more fully from a considerati of the following examples which are given for the purpc of illustration only and are not to be construed as lim ing the invention in spirit or in scope. In these exampl quantities are indicated in parts by weight and tempei tures in degrees centigrade (° C.).

Example 1

To a suspension of 232 parts of 2-chlorothioxanthe in 1400 parts of ether is added with stirring a solution 70 parts of butyl lithium in heptane. The resultant sol tion is refluxed for 3 hours and poured into a slurry solid carbon dioxide and ether. The mixture is allow to stand for 15 hours and then potassium hydroxide sol tion is added to dissolve the precipitated carboxylic ac salt. The aqueous layer is separated and acidified wi hydrochloric acid. The solid which precipitates is se arated and recrystallized from 2-propanol to give 2-chlor thioxanthene-9-carboxylic acid melting at about 22 227° C.

Example 2

A suspension of 15 parts of 9-thioxanthenecarboxy acid in 130 parts of dry toluene is heated to reflux and 11 parts of thionyl chloride is added. The resultant mixtu is refluxed for 2 hours and the solvent and excess thior chloride is removed under reduced pressure. Addition hexane to the residue causes it to crystallize. This solid 9-thioxanthenecarbonyl chloride and it is used withc further purification.

In the same manner, 2-chloro-9-thioxanthenecarboxy acid is converted to 2-chloro-9-thioxanthenecarbor chloride.

Example 3

A solution of 73 parts of 9-trioxanthene-carboxylic ac and 10 parts of 4-toluenesulfonic acid in 360 parts methanol is refluxed for 20 hours. Excess methanol then removed under reduced pressure and the residue extracted with ether. The ether solution is washed wi potassium carbonate solution and dried and the solvent evaporated under reduced pressure to give methyl 9-ti oxanthenecarboxylate melting at about 95–96° C.

Example 4

49 parts of 4-pipecoline is dissolved in a mixture of 1 parts of water and 100 parts of concentrated hydrochlor acid, and a solution of 37 parts of sodium nitrite in parts of water is added portionwise at 50° C. with stirrir The resultant mixture is allowed to stand for one ho before it is extracted with ether. The ether layer separated and dried and the solution is distilled to gi 1-nitroso-4-pipecoline.

A suspension of 13.1 parts of lithium aluminum hydri in 700 parts of tetrahydrofuran is heated to reflux and solution of 31 parts of 1-nitroso-4-pipecoline in 495 pai of tetrahydrofuran is added portionwise. When the ad tion is complete, the mixture is refluxed for an additior 1.5 hours and then decomposed by the cautious additii of 14 parts of water followed by 10 parts of 20% sodiu hydroxide solution and 48 parts of water. The orgar layer is separated, dried, and distilled to give 1-amino- pipecoline.

Example 5

A solution of 15.4 parts of methyl 9-thioxanthenec; boxylate and 7.7 parts of 85% hydrazine hydrate in 1 parts of ethanol is refluxed for 20 hours. The solvent removed under reduced pressure and the residue is 1 crystallized from ethanol to give 9-thioxanthenecarboxy acid hydrazide melting at about 196–198° C.

3

*Example 6*

.6 parts of 2-chloro-9-thioxanthenecarboxylic acid is
ed with 160 parts of methanol and 3 parts of 4-tolu-
ilfonic acid according to the procedure described in
nple 3 to give methyl 2-chloro-9-thioxanthenecar-
late melting at about 97–98° C. A solution of 15
of methyl 2-chloro-9-thioxanthenecarboxylate and
arts of 85% hydrazine hydrate in 160 parts of ethanol
fluxed for 20 hours. When the reaction mixture is
d, 2-chloro-9-thioxanthenecarboxylic acid hydrazide
allizes from the solution. This compound melts at
t 210–213° C. and it has the following formula

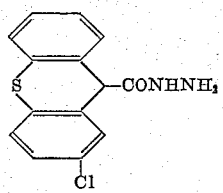

an equivalent quantity of 9-xanthenecarbonyl chlo-
is substituted for the 2-chloro-9-thioxanthenecarbonyl
ide and the above procedure is repeated, the product
xanthenecarboxylic acid hydrazide, melting at about
248° C.

*Example 7* solution of 6.8 parts of 9-xanthenecarboxylic acid
azide, 4 parts of phenylacetone and 2 parts of acetic
in dimethyl formamide is hydrogenated over 0.5 part
atinum oxide at a temperature of 25° C. under pres-
of 1750 pounds per square inch. The hydrogenation
ure is filtered to remove the catalyst and the filtrate
uted with water to precipitate the product. The solid
n separated by filtration and crystallized from ethanol
ve 1-(9-xanthenecarbonyl)-2-(α-methylphenethyl)hy-
ne melting at about 185–190° C. with decomposition.
benzaldehyde is substituted for phenylacetone and
above procedure is repeated, the product is 1-(9-
enecarbonyl)-2-benzylhydrazine.
kewise, if an equivalent quantity of acetaldehyde is
ituted for the phenylacetone and the above procedure
eated, the product is 1-(9-xanthenecarbonyl)-2-ethyl-
azine.

*Example 8*

.2 parts of xanthenecarbonyl chloride is added to a
ion of 6 parts of 1,1-dimethylhydrazine in toluene.
mixture is allowed to stand for 4 hours and the pre-
ite which forms is separated and suspended in water
h contains excess of potassium carbonate. The re-
nt mixture is extracted with chloroform, the dried
oform extracts are concentrated to give 1,1-dimethyl-
xanthenecarbonyl)hydrazine. This compound melts
out 235–237° C. after recrystallization from abso-
ethanol.

*Example 9*

7.4 parts of 1,1,2-trimethylhydrazine is substituted
he 6.0 parts of 1,1-dimethylhydrazine and the pro-
re of Example 8 is repeated, the product is 1,2,2-tri-
yl-1-(9-xanthenecarbonyl)hydrazine melting at about
140° C. after recrystallization from absolute ethanol.
compound has the following formula

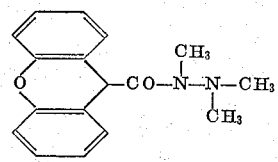

iis case, a slight modification of the procedure of
iple 8 was used. No precipitate formed when the
ants were allowed to stand in solution so it was
sary to evaporate the reaction solvent to obtain the
: solid.

*Example 10*

The procedure of Example 8 is repeated using an equiv-
alent quantity of 9-thioxanthenecarbonyl chloride in place
of the 9-xanthenecarbonyl chloride. The product is iso-
lated in the indicated manner to give 1,1-dimethyl-2-(9-
thioxanthenecarbonyl)hydrazine melting at about 196–
198° C. after recrystallization from absolute ethanol.

*Example 11*

If an equivalent quantity of 1,1-diethylhydrazine is sub-
stituted for the 1,1-dimethylhydrazine and the procedure
of Example 8 is repeated, the product is 1,1-diethyl-2-(9-
xanthenecarbonyl)hydrazine.

*Example 12*

To a solution of 24.4 parts of 9-xanthenecarbonyl chlo-
ride in 225 parts of chloroform is added a solution of
10 parts of 1-aminopiperidine in 75 parts of chloroform.
The reaction mixture is allowed to stand for 16 hours.
The mixture is concentrated to give the crude solid prod-
uct. This solid is suspended in potassium hydroxide solu-
tion and the suspension is extracted with chloroform.
The solvent is evaporated from the dried chloroform
solution to give crude N-piperidino-9-xanthenecarboxa-
mide. This compound melts at about 261–265° C. after
crystallization from absolute ethanol. It has the follow-
ing formula

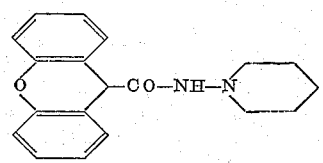

If an equivalent quantity of 1-amino-4-pipecoline is
substituted for the 1-aminopiperidine and the above pro-
cedure is repeated, the product is N-(4-methylpiperidino)-
9-xanthenecarboxamide.

*Example 13*

To a solution of 5.29 parts of 1-aminopyrrolidine in
toluene is added 7.3 parts of 9-xanthenecarbonyl chloride.
The resultant mixture is allowed to stand for 4 hours and
the solid which separates is suspended in an aqueous solu-
tion containing an excess of potassium carbonate. The
resulting mixture is extracted with cholorform and the
chloroform extract is dried and concentrated. The resid-
ual solid is recrystallized from absolute ethanol to give
N - (1-pyrrolidinyl) - 9 - xanthenecarboxamide melting
at about 226–228° C.

*Example 14*

If an equivalent quantity of 1-amino-2,6-dimethyl-
piperidine is substituted for the 5.2 parts of 1-amino-
pyrrolidine and the procedure of Example 13 is repeated,
the product is N-(2,6-dimethylpiperidino)-9-xanthenecar-
boxamide which melts at about 275–280° C. (with de-
composition) after recrystallization from absolute ethanol.

*Example 15*

7.8 parts of 9-thioxanthenecarbonyl chloride is reacted
with 7.0 parts of 1-aminohexamethylenimine according to
the procedure described in Example 13. The product is
N-hexamethylenimino-9-thioxanthenecarboxamide. This
compound melts at about 203–204° C. after recrystalliza-
tion from absolute ethanol. It has the following formula

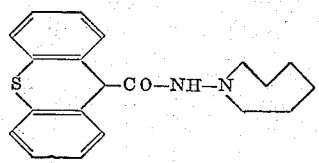

Example 16

A solution of 7.9 parts of 1-aminohexamethylenimine in chloroform is prepared and 7.3 parts of 9-xanthene-carbonyl chloride is added thereto. The resulting mixture is allowed to stand for 4 hours before it is filtered to remove the precipitated product. This solid is suspended in an excess of aqueous potassium carbonate solution. The mixture is extracted with chloroform and the solvent is evaporated from the dried extract. The residual material is recrystallized from absolute ethanol to give N-hexamethylenimino-9-xanthenecarboxamide melting at about 232–234° C.

What is claimed is:

1. A compound of the formula

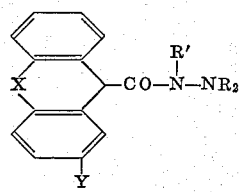

wherein X is an element of periodic group VI of an atomic weight below 40; R′ is selected from the group consisting of hydrogen and methyl; —NR$_2$ is selected from the group consisting of amino (lower alkyl) amino, di(lower alkyl)amino, phenyl(lower alkyl)amino, and

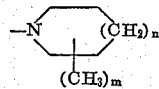

wherein $n$ and $m$ are whole numbers between 0 and 2 inclusive; and Y is selected from the group consisting hydrogen and chlorine.

2. 9-thioxanthenecarboxylic acid hydrazide.
3. 9-xanthenecarboxylic acid hydrazide.
4. A compound of the formula

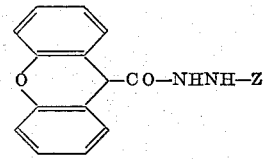

wherein Z is phenyl(lower alkyl)—.

5. 1-(α-methylphenethyl)-2-(9-xanthenecarbonyl) l drazine.

6. A compound of the formula

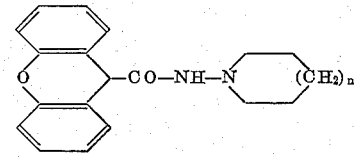

wherein $n$ is a whole number between 0 and 2 inclusi

7. N-(1-pyrrolidinyl)-9-xanthenecarboxamide.

References Cited in the file of this patent
UNITED STATES PATENTS

| 2,661,351 | Cusic | Dec. 1, 19 |
| 2,661,353 | Cusic | Dec. 1, 19 |
| 2,977,359 | Rutschmann | Mar. 28, 19 |